Dec. 23, 1952 W. MIKULAS 2,622,295
SLIDE FASTENER
Filed Feb. 5, 1949 2 SHEETS—SHEET 1

INVENTOR.
WILLIAM MIKULAS
BY James and Franklin
Attorneys

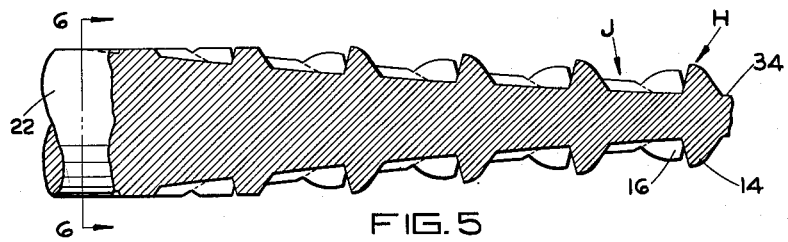
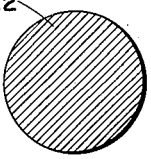
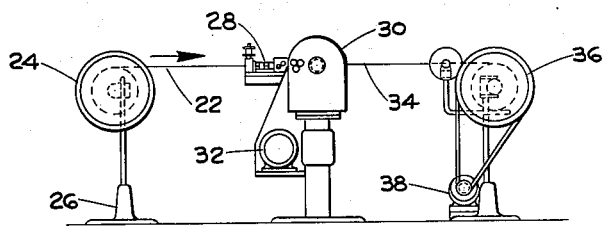
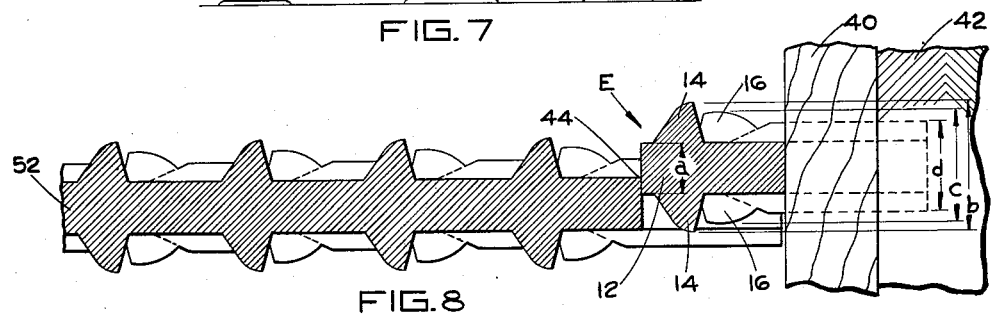
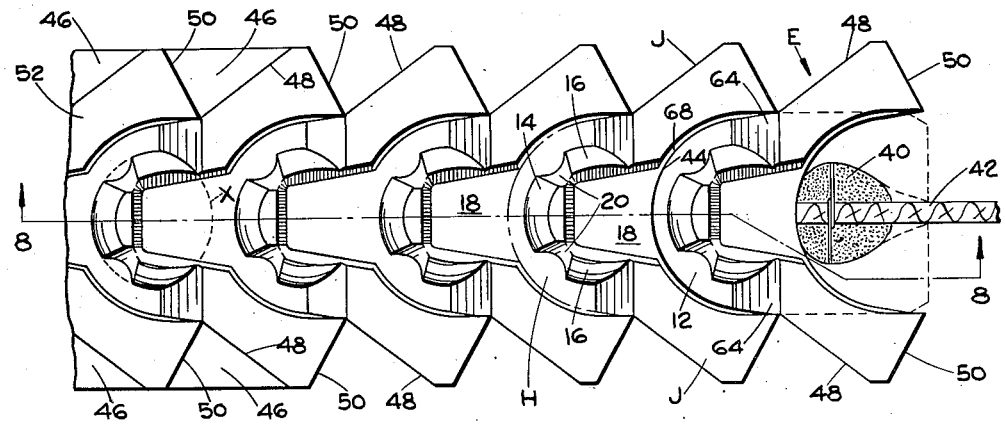
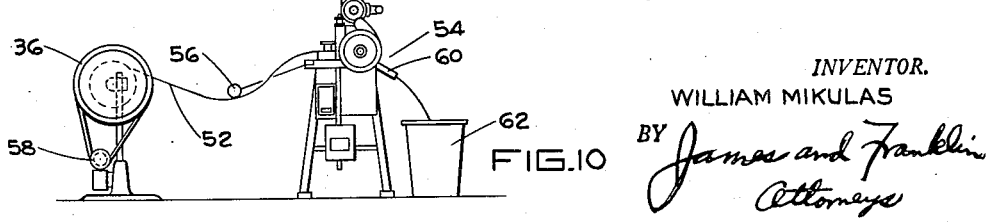
INVENTOR.
WILLIAM MIKULAS Patented Dec. 23, 1952

2,622,295

UNITED STATES PATENT OFFICE 2,622,295

SLIDE FASTENER

William Mikulas, Staten Island, N. Y., assignor to Conmar Products Corporation, Newark, N. J., a corporation of New Jersey Application February 5, 1949, Serial No. 74,785

17 Claims. (Cl. 24—205.13)

This invention relates to slide fasteners, and more particularly to slide fasteners having double-acting or two-way acting elements or "scoops."

A slide fastener having double-acting or two-way acting fastener elements will function properly regardless of the direction in which the sliders are faced relative to the elements. This makes it possible to employ two oppositely directed sliders on a single pair of stringers for special purposes. It also is of advantage in case of accidental opening of the fastener beneath the slider.

One object of the invention is to generally improve double-acting or two-way scoops, and more particularly symmetrical scoops.

It is desirable that the finished slide fastener be highly flexible, and that the fastener elements be designed and formed to afford maximum resistance to transverse, lateral and all types of flexual disengaging forces. It also is desired that the individual fastener elements be so formed that they afford a maximum resistance to forces which tend to pull them off the tape.

From a manufacturing cost standpoint, it is desired that a fastener having the properties and characteristics enumerated be made by a high speed method, and with tools which provide long life before necessitating replacement. From a material cost standpoint, it is desired that a fastener be fabricated with a minimum amount of scrap, and with the use of a minimum amount of fastener element material per unit length of finished fastener. To fulfill these desiderata is an important object of the invention.

In order to make my improved fastener having symmetrical, double-acting elements at a minimum manufacturing cost, I first form a fastener element strip by a coining or rolling method such as disclosed in U. S. Letters Patent 2,201,068, issued to George Wintritz, on May 14, 1940. The fastener strip is so designed that it affords a maximum punch and die life in the severing and attaching machine. To make the fastener at a minimum material cost, the element strip is made nearly scrapless, much as is disclosed in U. S. Letters Patent 2,302,075 and 2,338,884, issued to Frederick Ulrich on November 17, 1942, and January 11, 1944, respectively. The other aspect of material savings, namely the use of a minimum amount of fastener element material per unit length of fastener, is obtained by the design and configuration of the fastener element itself.

To accomplish the foregoing general objects, and other more specific objects which will hereinafter appear, my invention resides in the fastener element and strip and their relation one to the other, as are hereinafter more particularly described in the following specification. The specification is accompanied by drawings in which:

Fig. 5 is a fragmentary side view, partly in section, through a metal wire and strip in which are formed a series of the fastener elements shown in Fig. 1;

Fig. 6 is a section taken in the plane of the line 6—6 of Fig. 5;

Fig. 7 is an overall, small scale view of apparatus for forming the fastener element strip of Fig. 5 by roll-coining the same;

Fig. 8 is a vertical section of the coined strip taken approximately in the plane of line 8—8 of Fig. 9;

Fig. 9 is a plan view of the element strip as it is severed from the endmost fastener element being attached to a tape; and Fig. 10 is an overall, small scale view of the so-called "scoop machine" for severing and attaching individual fastener elements to a tape.

Figure 3:
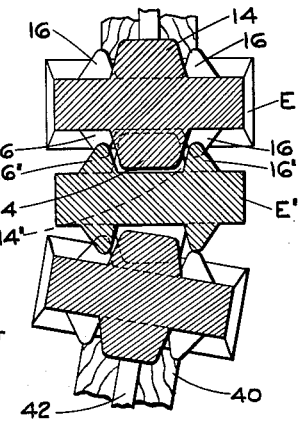
Fig. 3 is a section taken approximately in the plane of line 3—3 of Fig. 2, illustrating the co-action of the fastener elements when the fastener is flexed.
Figure 1:
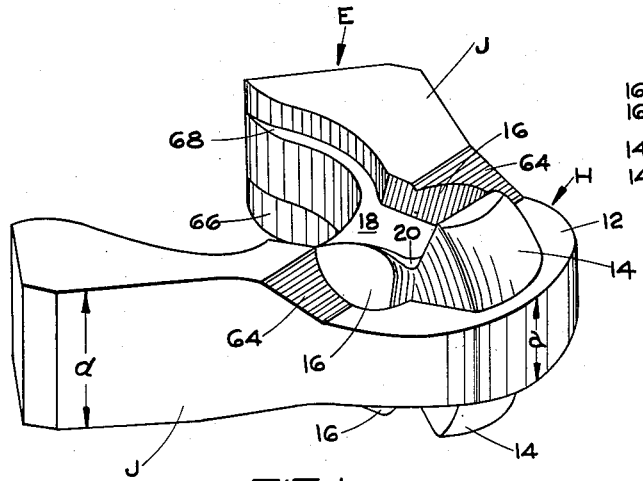
Fig. 1 is a perspective view of my improved fastener element or scoop, prior to attaching same to the tape, and illustrating some features of the present invention.

Referring to the drawings, and more particularly to Figs. 1 through 4, the fastener element or scoop E, in its broad aspects, comprises a head generally designated H, and tape clamping jaws generally designated J. The head comprises a base 12 upon one face of which is formed a projection 14. The projection 14 is disposed near the leading edge of the base and is located on a median line longitudinally of the element so that it is centrally located with respect to the sides of the element. A pair of laterally spaced ridges 16 are disposed one on each side of the projection 14 so that the ridges may be generally and positionally described as spaced, equal segments of an arc, with the projection constituting the connecting segment. The projection 14 and the ridges 16 form a pocket 18 which is set back towards the jaws J relative to the projection.

Channels 20 are provided between the ridges 16 and the projection 14. The channels are shown as shallow depressions between the projection and ridges and passing between the pocket 18 and the base 12. However, it is within the scope of the invention to deepen the channels downwardly as far as the horizontal plane of the base 12.

On the other face of the head or base 12 there also are provided a projection, ridges, a pocket and channels of the same configuration and in the same relative positions as described, so that the fastener element E is symmetrical with respect to a horizontal plane passing through the longitudinal center of the element. The element E also is symmetrical with respect to a vertical plane extending longitudinally between the jaws. Thus, the element is symmetrical with respect to two mutually perpendicular planes extending longitudinally of the element.

Figure 2:
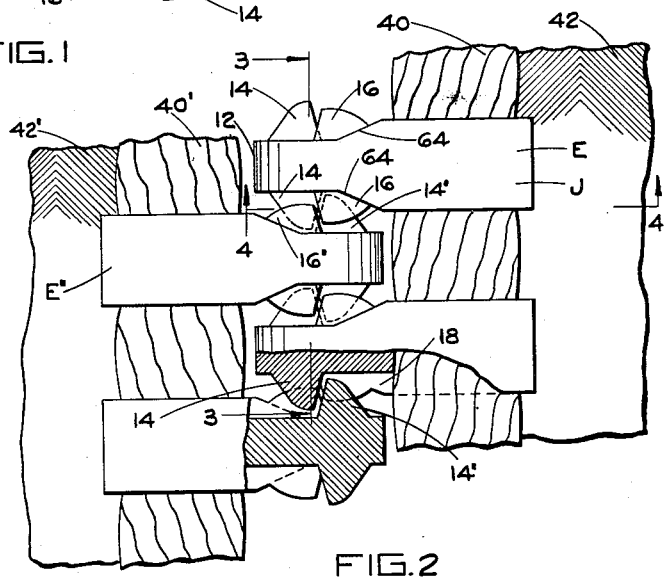
Fig. 2 is a fragmentary view, partly in section, of a slide fastener utilizing the fastener element shown in Fig. 1.
Figure 4:
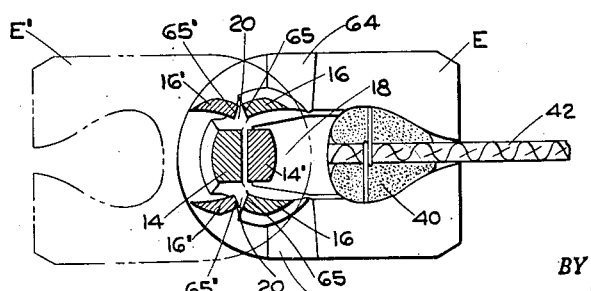
Fig. 4 is a section taken approximately in the plane of line 4—4 of Fig. 2.

The manner in which the fastener elements interlock when meshed together will be clear from a study of Figs. 2, 3 and 4 of the drawing. The projection 14 comes within the pocket 18 and the projection 14' of the adjacent element, as is clearly shown in Figs. 2 and 4. The ridges 16' of the adjacent element come on each side of the projection 14 of the first element.

Considered in a somewhat different aspect, and referring to Fig. 9 of the drawing, the fastener element may be described as having a long arcuate protuberance 16, 14, 16, enclosing a pocket 18 which is open toward the jaws. Both sides of the head have similar long arcuate protuberances. The protuberances are interrupted to form the cross channels 20 at opposite points so selected that when the elements of a slide fastener are meshed as shown in Figs. 2, 3 and 4, the channels of one element register with the channels of the adjacent element to permit the long arcuate protuberances to intersect one another in interlocked relation. It will be understood that the distance from the top of the protuberance on one side, to the top of the protuberance on the other side, is greater than one-half the pitch or spacing between the successive elements of one stringer, and that the interruptions or channels 20 are made at least deep enough to permit the meshing together of the elements at the selected pitch. In practice the clearances are preferably much greater in order to provide a free running and flexible fastener. From inspection of Fig. 4 it will be seen that when the elements are meshed with the arcuate protuberances intersecting as described, the end result is that the projections 14 and 14' are disposed back to back, and the ridges 16 and 16' are disposed substantially end to end.

Described in different terms, the fastener element is a generally U-shaped body of material J, H, J (Fig. 9) having a smaller U-shaped protuberance 16, 14, 16 on each side of the element at the closed end of the large U, said smaller U's pointing in the same direction as the large U. It should be understood that in theory the parts 16 may be made as high as the parts 14, and in functional sense, the large and small U's lie in generally collateral planes. Each of the small U's is interrupted at the bends of the U to form the cross channels 20. When the elements of the slide fastener are meshed as shown in Figs 2, 3 and 4 the channels of one element register with the channels of the adjacent element to permit the small U's to intersect and consequently to interlock.

The fastener elements preferably are formed by preliminarily coining a wire into a strip having a continuous series of embryo elements. The wire may be round in cross-section, as shown in Fig. 6, flat or oval. The round wire is preferred for its slightly lower cost. Fig. 5 shows a short section of the wire as it is being coined into the embryo element strip shape. The wire may be coined to the desired shape in a punch press, but for economy and high speed manufacture it preferably is coined by rolling the same between appropriately shaped coining rolls. This is illustrated in Fig. 7 in which raw wire stock 22 is drawn from a reel 24 supported on a stand 26, and after passing through a straightener 28 is fed between coining rolls driven by gearing in housing 30, a motor 32 acting as a power source. The coined strip leaving the rolling mill is indicated at 34, and is wound upon a reel 36 operated by a motor 38. The rolling apparatus need not be described in detail for it may be substantially of the character shown and described in U. S. Letters Patent 2,201,068 previously referred to. The wire is rolled with the heads H first, so that it can be unwound jaws first from the reel 36.

Figs. 8 and 9 show how the coined strip having the embryo fastener elements formed therein is fed jaws first toward the beaded edge 40 of a tape 42. The strip is cut away from the endmost element E (or the element from the strip) by a suitable punch and die mechanism, the cut being made on the punch line 44. It will be observed that the side edges of the strip are serrated or notched (except for fins 46 of metal left in the serrations, which fins may be rolled quite thin). The serrations correspond to the ends of the jaws of the embryo elements, the jaws having diverging side walls 48 and end walls 50 which are substantially perpendicular to the side walls 48 so that the jaws when closed will have substantially parallel side walls and square ends. This is best shown in Fig. 4, and is also indicated in the dotted outline of the fastener element at the extreme right of Fig. 8. Moreover, the space between the spread jaws J in the coined strip is of the same outline as the head H, the elements being in nested relation with the head of one disposed between the jaws of the next element, without scrap or waste therebetween.

The wire may be coined without fin in the serrations, although it is more simple to permit such fin to be formed when the wire is coined. The fin may be preliminarily removed along the entire length of the strip, or it may be removed step by step as the elements are being severed from the strip by means of the punch and die mechanism in the severing and attaching machine. The latter arrangement is indicated in Fig. 9, in which the fin is shown removed very near the severing and attaching station.

Fig. 10 shows the machine for severing the fastener elements E from the embryo strip (or the strip from the embryo element) and for attaching the elements to the beaded edge of the tape. The machine comprises a reel 36 of the coined strip now fed jaws first, the reversed strip being designated 52, into an attaching machine generally designated 54. A loop of slack wire may be provided between the reel and the machine, this loop being measured by a suitable follower 56, the wire being unreeled intermittently by a small motor 58 as required by the attaching machine 54. The tape is fed into the machine, and a finished, continuous stringer is discharged through a trough or tube 60 into a suitable box or basket 62. The machine 54 need not be described in detail, for it is substantially of the type shown and described in U. S. Letters Patent to Ulrich, 2,302,075 and 2,338,884, previously referred to.

Referring to Figs. 1 through 4, 8 and 9 for a more specific description of the fastener element in preferred form, and the strip from which it is made, it will be observed that the projections 14 protrude vertically beyond the horizontal faces of the base 12. For comparative purposes, the thickness of the base 12 is designated "a" and the distance between the extremities of the projections 14 is designated "b" in Fig. 8. Since the fastener element strip is coined so that the horizontal surfaces of the base 12 are in substantially the same planes as the horizontal surfaces of the pockets 18, the thickness of the section of the strip at the pockets 18 likewise is "a". As shown in Fig. 9, the pockets 18 extend from within the projection and ridges of one embryo element to the projections and ridges of the adjacent embryo element, so that upon severing the strip into separate elements the punch line 44 passes through the base 12 of one element and the pockets of the adjacent element.

The ridges 16 project from the horizontal surfaces of the base 12 and the pockets 18, the distance between the extremities of the ridges 16 being designated c in Fig. 8. While, as illustrated, the ridges 16 do not protrude as far as the projections 14, it is within the scope of the invention to form the ridges 16 of the same height as the projections 14, or less than is shown if it is so desired.

The jaws J may be of greater or less thickness than shown. For example, they may be of the same thickness as the base 12. However, the clamping strength of the individual fastener element upon the beaded edge of the tape is proportional to the surface area of the clamping jaws. In order to provide increased clamping strength, the jaws are formed of a thickness which affords adequate clamping area, such thickness being designated d. However, it does not pay to make the jaws too thick, because if made much stronger than the tape, there is merely a waste of metal. Also the fastener will be less flexible. Thus, while the thickness d is greater than the thickness a, it is not as great as the distance between the extremities of the projections, that is, the distance b, or the distance between the extremities of the ridges, that is, the distance c. (The thicknesses a, b, c and d are all measured in the direction of the tape length.) To avoid a sharp break in section the strip may be formed or coined with a slope or bevel 64 between the horizontal surfaces of the base 12 and the jaws J. The sloping areas 64 are located adjacent each ridge 16 and extend laterally to the edges of the fastener element.

By coining the fastener element strip to the form and shape described, the fastener elements provide projections and ridges having large engaging surface areas for preventing transverse and lateral disengagement of opposed fastener elements on the stringers in the finished fastener. The realization of such large engaging surfaces, while maintaining exceedingly high flexibility in the fastener, is made possible by the provision of the intervening channels 20 between the projection 14 and the ridges 16 on each side of the base 12. The channels 20 permit a projection 14 to sink to a great depth into a pocket 18 of an opposing element while allowing the ridges 16 on opposing elements to bypass each other for interlocking engagement on opposite sides of the channels. This best is illustrated in Figs. 2, 3 and 4. It is preferred to form the channels 20 so that the adjoining projection and ridge surfaces will substantially complement each other when the projection of an element on one stringer is disposed within the pocket of an element on the other stringer. The ridges are disposed substantially end to end, and by providing the leading faces of the ridges, designated 65 and 65' in Fig. 4 with substantially flat surfaces, undue swivelling between opposed fastener elements is prevented.

The provision of the channels 20 also permits the fastener to be flexed to a considerable degree in any direction without unmeshing the fastener elements. Whether the fastener is curved sharply upon itself in the same plane, or whether the fastener is sharply folded upon itself so that portions thereof will lie in parallel planes, as shown for example in Fig. 3, the projections and ridges upon opposing fastener elements present such large interlocking surface areas towards each other that unmeshing is prevented. At the same time the presence of the intervening channels 20 imparts a remarkably high degree of flexibility to the fastener. It thus will be apparent that although large engaging surfaces are formed in the fastener elements for preventing transverse, lateral and flexural disengagement, there is no sacrifice of fastener flexibility.

Forming the fastener elements so that the projections 14 and the ridges 16 extend vertically a comparatively large distance beyond the horizontal surfaces of the jaws J permits opening or enlarging the pitch (the distance between similar points of adjacent elements on one stringer). In this manner, a highly flexible fastener which resists all types of disengaging forces is attained while using a minimum amount of fastener element material per unit length of finished fastener, and without sacrificing high clamping strength of an individual element upon the tape.

Referring again to Figs. 8 and 9, it will be observed that the punch which severs the fastener element E from the strip along the line 44 cuts through the thinnest section, a, of the strip, except for the very small section at the bevelled portions 64. Thus, the punch line 44 is through a section of uniform thickness throughout substantially all of its length. Moreover, it will be noted that the projections 14 and the ridges 16 are located on the periphery of a circle, designated by the dotted line x. Actually the exterior surfaces of the projection and ridges on one side of the element preferably conform to the surface of a cone having its base in the broad or horizontal plane of the element. Thus any horizontal plane will intersect parts of a circle, as can be seen in Fig. 4, the elevated circle being smaller in radius than the base circle. It need not be a straight-sided cone, the more important thing being that it is a surface of revolution, but for convenience may be referred to as conical.

Such configuration of the coined strip greatly facilitates making the tools needed in manufacturing the strip and in severing the same. For example, if the strip is coined in a reciprocating press the conical configuration facilitates making the necessary coining punch and die. If the strip is rolled, as is preferred and here illustrated, the conical configuration facilitates making the master punch used in forming the die rolls for the rolling mill. In the attaching machine a stationary die is disposed beneath the endmost element, and the said die has a pocket to receive the downward projections. The pocket is important not only to locate the endmost element, but also to provide a peripheral land which supports the metal around the head of the element as it is being severed. The conical configuration facilitates the accurate formation of the pocket in the stationary die. Similarly, the punch which presses the strip downwardly away from the endmost element (as shown in Fig. 8) may be more readily contoured to receive the upward projections on the strip.

By coining the strip so that the material within the jaws J has the thin section $a$ of substantially uniform thickness surrounded by the thicker section $d$, the die of the punch and die mechanism is provided with a leading locating surface beyond the punch line. This surface, designated 66 in Fig. 1, greatly facilitates the accuracy of the severing operation. The resulting shoulder 68 is very small, on the order of one thousandth of an inch. When the jaws J are clamped about the beaded edge of the tape, the inherent resiliency of the textile material causes the entire inner surfaces of the jaws to firmly grip the tape edge. In view of these features of the element strip contour, the life of the punch and die mechanism in the scoop machine is considerably lengthened and the maintenance cost of the equipment is reduced.

It is believed apparent that my novel fastener element and the element strip from which the elements are severed not only provides a highly improved slide fastener from a functional standpoint, but also results in manufacturing and material economy.

While it is preferred to form a nearly scrapless fastener element strip as described, it is within the scope of the invention to form the strip with material between adjacent embryo elements, as shown for example in the Wintritz Patent 2,201,068.

It will be understood that while I have shown and described the invention in several preferred forms, many changes may be made in the fastener element and the strip from which the fastener elements are formed, without departing from the spirit of the invention as sought to be defined in the following claims. In the claims the reference to a cone is intended to apply to a surface of revolution which is tapered or rounded so as to be approximately conical, even though not a straight-sided cone.

I claim:

1. A double-acting fastener element or scoop for a slide fastener, said element comprising a head and jaws, said head having a base on one face of which is formed a projection and a pair of ridges, said projection and ridges defining a pocket set back towards the jaws relative to the projection, and a channel intermediate each ridge and the projection, the opposite face of said base also having a projection, ridges, a pocket and channels in the same relationship whereby the element is symmetrical with respect to two mutually perpendicular planes extending longitudinally of the element, said channels permitting projections and ridges on opposed elements to provide large engaging surface areas for preventing lateral, transverse and flexural disengagement while maintaining a high degree of flexibility between elements.

2. A double-acting fastener element or scoop for a slide fastener, said element comprising a head and jaws, said head having formed on one side thereof a projection and a pair of ridges, said projection and ridges defining a pocket set back towards the jaws relative to the projection, and a channel intermediate each ridge and the projection, the other side of said head also having a projection, ridges, a pocket and channels in the same relationship whereby the element is symmetrical with respect to two mutually perpendicular planes extending longitudinally of the element, said channels permitting projections and ridges on opposed elements to provide large engaging surface areas for preventing lateral, transverse and flexural disengagement while maintaining a high degree of flexibility between elements, the distance between the extremities of the projections and the distance between the extremities of the ridges on opposite sides of the head being greater than the thickness of the jaws.

3. A double-acting fastener element or scoop for a slide fastener, said element comprising a head and jaws, said head having a base on one face of which is formed a projection and a pair of laterally spaced ridges, said projection and ridges defining a pocket set back towards the jaws relative to the projection, and a channel intermediate each ridge and the projection, the other face of said base also having a projection, ridges, a pocket and channels in the same relationship whereby the element is symmetrical with respect to two mutually perpendicular planes extending longitudinally of the element, said jaws having a thickness greater than the thickness of the base, and said channels permitting projections and ridges on opposed elements to provide large engaging surface areas for preventing lateral, transverse and flexural disengagement while maintaining a high degree of flexibility between elements.

4. A double-acting fastener element or scoop for a slide fastener, said element comprising a head and jaws, said head having a base on one face of which is formed a projection and a pair of laterally spaced ridges, said projection and ridges defining a pocket set back towards the jaws relative to the projection, and a channel intermediate each ridge and the projection, the other face of said base also having a projection, ridges, a pocket and channels in the same relationship whereby the element is symmetrical with respect to two mutually perpendicular planes extending longitudinally of the element, said jaws having a thickness greater than the thickness of the base, said channels being formed as depressions intermediate the projection and its adjacent ridge so that adjoining projection and ridge surfaces will substantially complement each other when the projection of one element is disposed within the pocket of the opposing element, said channels permitting projections and ridges on opposed elements to provide large engaging surface areas for preventing lateral, transverse and flexural disengagement while maintaining a high degree of flexibility between elements.

5. A double-acting fastener element or scoop for a slide fastener, said element comprising a head and jaws, said head having a base on one face of which is formed a projection and a pair of laterally spaced ridges, said projection and ridges defining a pocket set back towards the jaws relative to the projection, and a channel intermediate each ridge and the projection, the other face of said base also having a projection, ridges, a pocket and channels in the same relationship whereby the element is symmetrical with respect to two mutually perpendicular planes extending longitudinally of the element, said jaws having a thickness greater than the thickness of the base, said channels being formed as depressions intermediate the projection and its adjacent ridge so that adjoining projection and ridge surfaces will substantially complement each other when the projection of one element is disposed within the pocket of the opposing element, said channels permitting projections and ridges on opposed elements to provide large engaging surface areas for preventing lateral, transverse and flexural disengagement while maintaining a high degree of flexibility between elements, the distance between the extremities of the projections and the distance between the extremities of the ridges on opposite sides of the head being greater than the thickness of the jaws.

6. A double-acting fastener element or scoop for a slide fastener, said element comprising a head and jaws, said head having a base the surfaces of which are in substantially horizontal planes, a projection and a pair of ridges formed on one base surface, said projection being disposed near the leading edge of the base and located on a median line which extends longitudinally of the element and said ridges being laterally spaced one on each side of the projection so that said projection and ridges are positioned generally in a semi-circle, said projection and ridges defining a pocket set back towards the jaws relative to the projection, and a channel intermediate each ridge and the projection, the other base surface also having formed thereon a projection, ridges, a pocket and channels in the same relationship whereby the element is symmetrical with respect to two mutually perpendicular planes extending longitudinally of the element, said pockets having surfaces in substantially the same planes as said base surfaces, said jaws having a thickness greater than the thickness of the base, said channels being formed as depressions intermediate the projection and its adjacent ridge so that adjoining projection and ridge surfaces will substantially complement each other when the projection of one element is disposed within the pocket of the opposing element, said channels permitting projections and ridges on opposed elements to provide large engaging surface areas for preventing lateral, transverse and flexural disengagement while maintaining a high degree of flexibility between elements.

7. A double-acting fastener element or scoop for a slide fastener, said element comprising a head and jaws, said head having a base the surfaces of which are in substantially horizontal planes, a projection and a pair of ridges formed on one base surface, said projection being disposed near the leading edge of the base and located on a median line longitudinally of the element and said ridges being laterally spaced one on each side of the projection so that said projection and ridges are positioned generally in a semi-circle, said projection and ridges defining a pocket set back towards the jaws relative to the projection, and a channel intermediate each ridge and the projection, the other base surface also having formed thereon a projection, ridges, a pocket and channels in the same relationship whereby the element is symmetrical with respect to two mutually perpendicular planes extending longitudinally of the element, said pockets having surfaces in substantially the same planes as said base surfaces, said jaws having a thickness greater than the thickness of the base, said channels being formed as depressions intermediate the projection and its adjacent ridge so that adjoining projection and ridge surfaces will substantially complement each other when the projection of one element is disposed within the pocket of the opposing element, said channels permitting projections and ridges on opposed elements to provide large engaging surface areas for preventing lateral, transverse and flexural disengagement while maintaining a high degree of flexibility between elements, the distance between the extremities of the projections and the distance between the extremities of the ridges on opposite sides of the head being greater than the thickness of the jaws.

8. A double-acting fastener element or scoop for a slide fastener, said element comprising a head and jaws, said head having a base on one face of which is formed a projection and a pair of spaced ridges, said projection and ridges defining a pocket, the ends of said ridges terminating short of the projection to provide channels therebetween at the corners of the pocket, the opposite face of said base also having a projection, ridges, channels and a pocket in the same relationship whereby the element is symmetrical with respect to two mutually perpendicular planes extending longitudinally of the element, the arrangement being such that when the elements of a slide fastener are interlocked the ridges of one element are disposed end to end relative to the ridges of the other, and the projection of one element comes within the pocket of the other.

9. A double-acting fastener element or scoop for a slide fastener, said element comprising a head and jaws, said head having a base on one face of which is formed a projection extending transversely of the element and a pair of spaced ridges extending longitudinally of the element, said projection and ridges defining a pocket, the ends of said ridges terminating short of the projection to provide channels therebetween at the corners of the pocket, the opposite face of said base also having a projection, ridges, channels and a pocket in the same relationship whereby the element is symmetrical with respect to two mutually perpendicular planes extending longitudinally of the element, the arrangement being such that when the elements of a slide fastener are interlocked the ridges of one element come on each side of the projection of the other, the ridges of one element are disposed end to end relative to the ridges of the other, and the projection of one element comes within the pocket and projection of the other, the exterior surfaces of the projection and ridges conforming to the surface of a cone having its base in the plane of the element.

10. A double-acting fastener element or scoop for a slide fastener, said element comprising a head and jaws, said head having a base on one face of which is formed a long arcuate protuberance enclosing a pocket which is open toward the jaws, the opposite face of said base having a similar long arcuate protuberance, each of said long arcuate protuberances being interrupted to form cross channels at two opposite points so selected that when the elements of a slide fastener are meshed, the channels of one element register with the channels of an opposite element to permit the long arcuate protuberances to intersect in interlocked relation.

11. A double-acting fastener element or scoop for a slide fastener, said element comprising a head and jaws, said head having a base on one face of which is formed a long arcuate protuberance enclosing a pocket which is open toward the jaws, the opposite face of said base having a similar long arcuate protuberance whereby the element is symmetrical with respect to two mutually perpendicular planes extending longitudinally of the element, each of said long arcuate protuberances being interrupted to form cross channels at two opposite points so selected that when the elements of a slide fastener are meshed, the channels of one element register with the channels of an opposite element to permit the long arcuate protuberances to intersect in interlocked relation, the exterior surface of each of the protuberances conforming to the surface of a cone having its base in the plane of the element.

12. A double-acting slide fastener comprising a pair of stringers having double-acting fastener elements or scoops secured therealong, each element comprising a head and jaws, said head having coined on one side thereof a long arcuate protuberance enclosing a pocket which is open toward the jaws, the other side of said head having coined thereon a similar long arcuate protuberance whereby the element is symmetrical with respect to two mutually perpendicular planes extending longitudinally of the element, the thickness of the jaws of the elements being less than one-half the pitch or spacing between elements on a stringer, each of said long arcuate protuberances being interrupted to form cross channels at two opposite points so selected that when the elements of the two stringers are meshed, the channels of one element register with the channels of an opposite element to permit the long arcuate protuberances to intersect in interlocked relation.

13. A double-acting slide fastener comprising a pair of stringers having double-acting fastener elements or scoops secured therealong, each element comprising a head and jaws, said head having coined on one side thereof a long arcuate protuberance enclosing a pocket which is open toward the jaws, the other side of said head having coined thereon a similar long arcuate protuberance whereby the element is symmetrical with respect to two mutually perpendicular planes extending longitudinally of the element, the thickness of the jaws of the elements being less than one-half the pitch or spacing between elements on a stringer, each of said long arcuate protuberances being interrupted to form cross channels at two opposite points so selected that when the elements of the two stringers are meshed, the channels of one element register with the channels of an opposite element to permit the long arcuate protuberances to intersect in interlocked relation, the exterior surface of each of the protuberances conforming to the surface of a cone having its base in the plane of the element.

14. A fastener element or scoop for a slide fastener, said element comprising a head and jaws, said head having a base on one face of which is formed a projection and a pair of ridges, said projection and ridges defining a pocket set back towards the jaws relative to the projection, and a channel intermediate each ridge and the projection, said channels permitting projections and ridges on opposed elements to provide large engaging surface areas for preventing lateral, transverse and flexural disengagement while maintaining a high degree of flexibility between elements.

15. A fastener element or scoop for a slide fastener, said element comprising a head and jaws, said head having a base on one face of which is formed a projection extending transversely of the element and a pair of spaced ridges extending longitudinally of the element, said projection and ridges defining a pocket which is open toward the jaws, the ends of said ridges terminating short of the projection to provide channels therebetween at the corners of the pocket, the arrangement being such that when the elements of a slide fastener are interlocked the ridges of one element come on each side of the projection of the other, the ridges of one element are disposed end to end relative to the ridges of the other, and the projection of one element comes within the pocket and projection of the other.

16. A fastener element or scoop for a slide fastener, said element comprising a head and jaws, said head having a substantially horizontal base, a projection and a pair of ridges formed on said base, said projection being disposed near the leading edge of the base and located on a median line longitudinally of the element and said ridges being laterally spaced one on each side of the projection so that said projection and ridges are positioned generally in a semi-circle, said projection and ridges defining a pocket set back towards the jaws relative to the projection, and a channel intermediate each ridge and the projection, said pocket having a surface in substantially the same plane as said base, said jaws having a thickness greater than the thickness of the head at the base, said channels being formed as depressions intermediate the projection and its adjacent ridge so that adjoining projection and ridge surfaces will substantially complement each other when the projection of one element is disposed within the pocket of the opposing element, said channels permitting projections and ridges on opposed elements to provide large engaging surface areas for preventing lateral, transverse and flexural disengagement while maintaining a high degree of flexibility between elements.

17. A double-acting slide fastener comprising a pair of stringers having double-acting fastener elements or scoops secured therealong, each element comprising a head and jaws, said head having a base on one face of which is formed a long arcuate protuberance enclosing a pocket which is open toward the jaws, the thickness of the jaws of the elements being less than one-half the pitch or spacing between elements on a stringer, the long arcuate protuberances of the elements being interrupted to form cross channels at two opposite points so selected that when the elements of the two stringers are meshed, the channels of one element register with the channels of an opposite element to permit the long arcuate protuberances to intersect in interlocked relation.

WILLIAM MIKULAS.

REFERENCES CITED

The following references are of record in the file of this patent:

UNITED STATES PATENTS

| Number | Name | Date |
|---|---|---|
| 1,846,921 | Sundback | Feb. 23, 1932 |
| 2,018,099 | Sundback | Oct. 22, 1935 |
| 2,221,740 | Ulrich | Nov. 12, 1940 |
| 2,312,494 | Soave | Mar. 2, 1943 |
| 2,330,001 | Morin | Sept. 21, 1943 |
| 2,371,591 | Cizek | Mar. 13, 1945 |
| 2,440,007 | Frank | Apr. 20, 1948 |